(12) United States Patent
Ramsey et al.

(10) Patent No.: US 11,662,179 B2
(45) Date of Patent: May 30, 2023

(54) CAMOUFLAGE FABRICS HAVING OPTIMIZED APPARENT COLOR AND NIR/SWIR SPECTRA

(71) Applicant: The Government of the United States of America, as represented by the Secretary of the Navy, Arlington, VA (US)

(72) Inventors: Scott Ramsey, Fredericksburg, VA (US); Troy Mayo, District Heights, MD (US); Sam Lambrakos, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 1228 days.

(21) Appl. No.: 15/794,903

(22) Filed: Oct. 26, 2017

(65) Prior Publication Data
US 2021/0310771 A1    Oct. 7, 2021

Related U.S. Application Data

(60) Provisional application No. 62/412,984, filed on Oct. 26, 2016.

(51) Int. Cl.
*F41H 3/02* (2006.01)
*G06T 11/00* (2006.01)

(52) U.S. Cl.
CPC .............. *F41H 3/02* (2013.01); *G06T 11/001* (2013.01); *G06T 2207/20024* (2013.01)

(58) Field of Classification Search
CPC  F41H 3/02; G06T 11/001; G06T 2207/20024
USPC ................................................ 382/108, 162
See application file for complete search history.

(56) References Cited

U.S. PATENT DOCUMENTS 9,062,938 B1 *   6/2015  McIntosh ............... A41D 31/02
2006/0222827 A1 * 10/2006  Marshall .................. F41H 3/02
                                                   428/195.1

OTHER PUBLICATIONS

R.H. Volmerhasuen, E. Jacobs, J. Hixon and M. Friedman, "Targeting Task Performance (TTP) Metric, A new Model for Predicting Target Acquisition Performance," Technical report AMSEL-NV-TR-230, U.S. Army CERDEC, Fort Belvoir, VA, Mar. 2005.

(Continued)

*Primary Examiner* — Ishrat I Sherali
(74) *Attorney, Agent, or Firm* — U.S. Naval Research Laboratory

(57)  ABSTRACT

A method of evaluating camouflage for a specified area of responsibility, the method includes calculating an apparent spectrum of the camouflage at far field with respect to an observer; calculating an apparent spectrum of the specified area of responsibility at far field with respect to the observer; calculating a difference between the apparent spectrum of the camouflage with the apparent spectrum of the area of responsibility; and comparing the difference to a predetermined threshold, thereby determining suitability of the camouflage for the specified area of responsibility.

7 Claims, 16 Drawing Sheets

(56) References Cited

OTHER PUBLICATIONS

M. Petrou and Costas Petrou, Image Processing: The Fundamentals, 2nd Ed., Ch 6 & 7, John Wiley and Sons, Ltd, United Kingdom, 2010.
Full-Spectrum Light Sources, National Lighting Product Information Program, vol. 7, Issue 5, Lighting Research Center, Rensselaer Polytechnic Institute, Troy, NY, Sep. 2003.
M.D. Fairchild, Color Appearance Models, 2nd Ed., John Wiley and Sons, Ltd, United Kingtom, 2005.

* cited by examiner

CAMOUFLAGE FABRICS HAVING OPTIMIZED APPARENT COLOR AND NIR/SWIR SPECTRA

RELATED APPLICATIONS

This application claims the benefit of U.S. Provisional Application No. 62/412,984 filed Oct. 26, 2016, which is hereby incorporated herein by reference in its entirety.

FIELD OF INVENTION

The present invention relates generally to patterned camouflage fabrics, and more particularly to fabrics with an apparent color or Near-Infrared (NIR) and/or Short Wave Infrared (SWIR) spectrum at far field.

BACKGROUND

Existing design criteria for camouflage fabrics with respect to color are based on close visual inspection. Similarly, existing design criteria with respect to NIR/SWIR spectra are based on spectrophotometer measurements, which are in the near field of reflectivity for individual segments comprising the camouflage pattern. Although quantitative metrics can be established for these near-field design criteria, e.g., clarity of separate pattern segments or intensity bounds on NIR/SWIR spectra as a function of wavelength, these metrics are inherently approximate for realistic far-field conditions associated with areas of responsibility (AORs). Existing image processing procedures are able in principle to provide quantitative metrics for far-field design criteria.

SUMMARY OF INVENTION

Therefore, described herein are methods of evaluation and design of camouflage fabrics that can encompass many types of patterns, combinations of dyes and base fabrics in order to achieve a specified apparent color or Near-Infrared (NIR) and/or Short Wave Infrared (SWIR) spectrum at far field with respect to a viewer or detection system for a specified area of responsibility (AOR). The general design process and associated procedures are based on the fact that camouflaged fabrics, as viewed under practical field conditions, due to the many different types of external factors, should appear significantly different in contrast to close visual inspection. The inherent complexity of external factors influencing apparent color and NIR/SWIR spectra suggests that the design of camouflage fabrics, as well as methodologies for their optimization with respect to a given AOR, be in terms of far-field and statistical characteristics of camouflaged fabrics, which are consistent with practical field conditions. Adaptation of a far-field based criterion for design of camouflage fabrics, to achieve specified apparent colors or NIR/SWIR spectra, implies that existing stockpiles of camouflage fabrics, having failed near-field criteria, which in many cases have been ad-hoc, can be utilized with respect to realistic conditions associated with areas of responsibility. Far-field and statistical characteristics of camouflaged fabrics, for optimal design with respect to apparent color and NIR/SWIR spectra, are readily quantifiable using available image processing procedures.

A consequence of near-field criteria for assessment of camouflage-fabric viability is accumulated stockpiles of fabrics. Design of camouflage fabrics according to far field with respect to a viewer or detection system for a specified AOR establishes an opportunity to use available fabric stockpiles.

Another consequence of near-field criteria for camouflage-fabric assessment is that of reduced life cycle. Far-field camouflage-fabric assessment using metrics based on image processing procedures can provide standards for increased life cycle of in-service garments.

According to one aspect of the invention, a method of evaluating camouflage for a specified area of responsibility includes calculating an apparent spectrum of the camouflage at far field with respect to an observer; calculating an apparent spectrum of the specified area of responsibility at far field with respect to the observer; calculating a difference between the apparent spectrum of the camouflage with the apparent spectrum of the area of responsibility; and comparing the difference to a predetermined threshold, thereby determining suitability of the camouflage for the specified area of responsibility.

Optionally, calculating an apparent spectrum of the camouflage includes the step of blurring an image of the camouflage by use of a point spread function.

Optionally, calculating an apparent spectrum of the camouflage includes the step of blurring an image of the camouflage by use of point spread distribution.

Optionally, the step of blurring the image of the camouflage includes image smoothing by a filtering or smoothing algorithm.

Optionally, the step of blurring the image of the camouflage includes image smoothing by mean filtering.

Optionally, calculating an apparent spectrum of the camouflage includes the step of modeling and simulating Equation 1.

Optionally, calculating an apparent spectrum of the specified area of responsibility includes the step of blurring an image of the camouflage by use of a point spread function.

Optionally, calculating an apparent spectrum of the specified area of responsibility includes the step of blurring an image of the camouflage by use of point spread distribution.

Optionally, blurring the image of the specified area of responsibility includes image smoothing by a filtering or smoothing algorithm.

Optionally, blurring the image of the specified area of responsibility includes image smoothing by mean filtering.

Optionally, calculating an apparent spectrum of the specified area of responsibility includes the step of modeling and simulating Equation 1.

The foregoing and other features of the invention are hereinafter described in greater detail with reference to the accompanying drawings.

DETAILED DESCRIPTION

Included herein are example qualitative and quantitative proofs of concept for apparent color, which are a comparison of images of a camouflaged uniform at different distances from viewer, and a study demonstrating that quantitative design metrics for apparent color of camouflage fabrics can be determined using standard image processing procedures. These procedures are readily extendable to determining metrics for apparent NIR/SWIR spectra.

Preliminarily, it is important to note that the concept of apparent color is directly related to other concepts concerning observability of camouflaged fabrics. These are the concepts of apparent spectrum and apparent pattern.

Although the present application focuses on apparent color, it should be noted that the analyses presented here also relate to characterization of camouflaged fabric with respect to the concepts of apparent spectrum and pattern. In particular, apparent spectra are of importance for assessment of camouflaged-fabric viability with respect to infrared detection, and apparent patterns are of importance for camouflaged-fabric assessment with respect to pattern quality, and thus pattern viability for specific environments and observer-target separations. For example, a given camouflage pattern may have sufficient quality for certain environments and observer-target separations, while having insufficient quality for others. Where the concepts of apparent color and its generalization, apparent spectrum, are based on far-field and statistical characteristics of camouflage patterns, the concept of apparent pattern is to be associated with intermediate distances between observer and target. Accordingly, quantitative metrics for camouflage-pattern viability based on apparent patterns should be different than those for apparent color and spectra.

Figure 1:
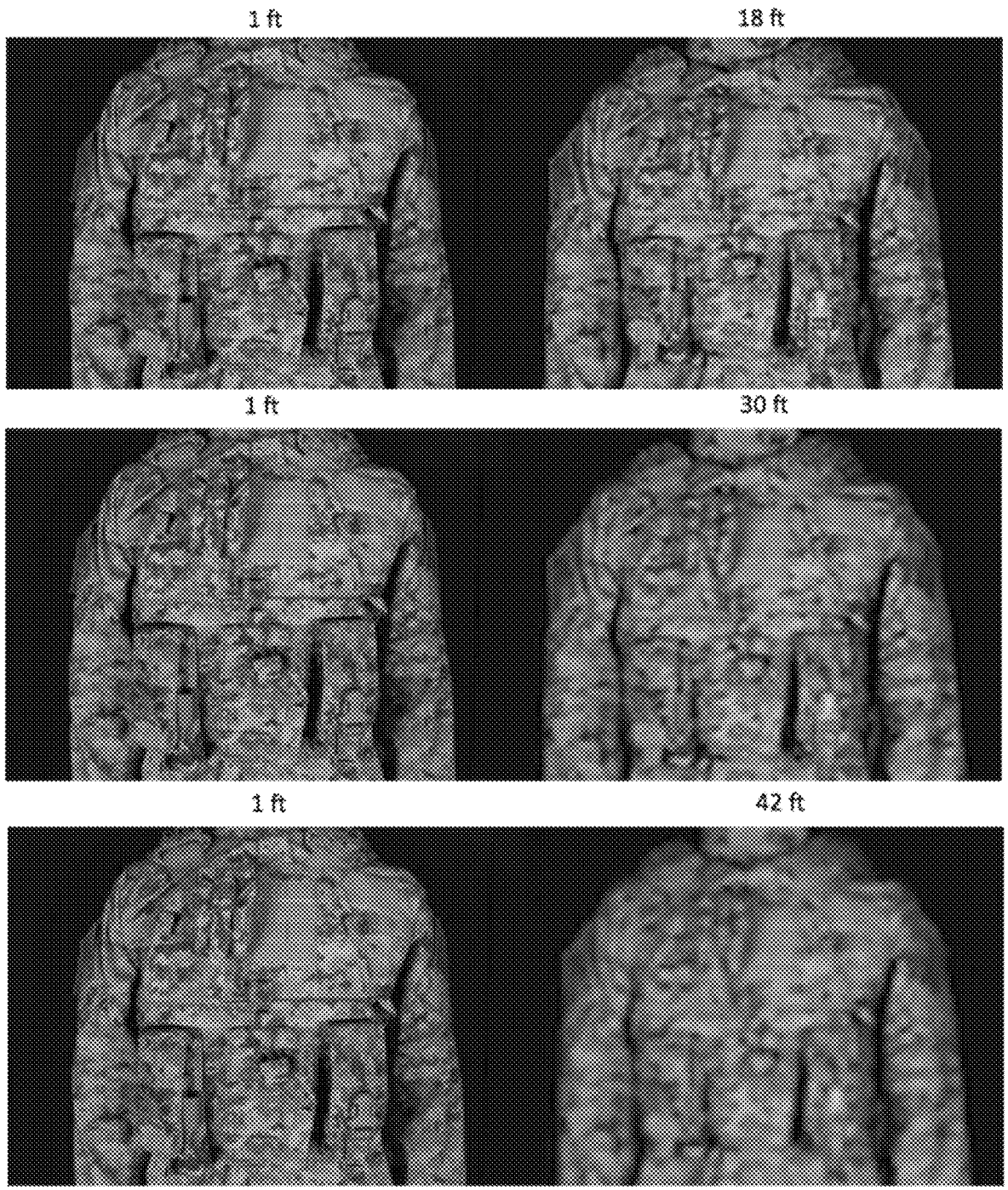
FIG. 1 shows images of camouflage fabrics corresponding to different viewing distances (near field vs. far field)

Referring first to FIG. 1, shown are images of camouflage fabrics corresponding to different viewing distances. Comparison of these images demonstrates, qualitatively, the concept of apparent color and, accordingly, that close visual inspection of camouflage fabrics does not represent a precise evaluation with respect to realistic distances for AORs.

As militaries progress towards fielding more advanced uniforms with multi-colored and highly detailed camouflage patterning, additional test methodologies are necessary in evaluating color in these types of camouflage textiles. Presented herein is an apparent color prediction model that can be used as a confirmation tool for color in visual camouflage evaluations. The apparent color is the combination of all visible wavelengths (380-760 nm) of light reflected from large ($\geq 1$ m$^2$) fabric sample sizes for a given standoff distance (e.g., 10-25 ft). Camouflage patterns lose resolution with increasing standoff distance, and eventually all colors within the pattern appear monotone (the "apparent color" of the pattern). Here we present a model based on laboratory-based spectroradiometric measurements of large camouflage fabric samples compared against the standard fabric. A sample set of apparent color pass/fail tolerances are also demonstrated for individual camouflage patterns.

The concept of apparent color within the visible range is examined with respect to its potential for practical utilization in the field and as a criterion for more realistic assessments of camouflaged-fabric viability, which should be with respect to realistic distances from observers, as would occur during actual operations. The examination considers the potential use of parametric models for simulating camouflaged-fabric as would be viewed as a function of distance from an observer, which would be a function of camouflage patterns, dielectric response properties of dyes and base fabrics, ambient atmospheres (e.g., fog or desert) and spectral ranges of external sources for camouflaged-fabric illumination (e.g., moonlight or dense overcast). Assessment of apparent color for camouflaged-fabrics based on simulation should represent a more quantitative criterion for their operational viability, which is in contrast to essentially qualitative assessments based on visual inspection at unrealistic distances from observers. Quantitative assessment of camouflaged-fabric viability according to apparent color could establish a foundation for more cost saving evaluation procedures, as well as procedures for reevaluating camouflaged-fabric stockpiles resulting from failures to meet previously established criteria. Prototype simulations of apparent color are also presented. In addition, the issue of model validation is discussed.

Given a camouflaged-fabric and associated camouflage pattern, which consists of a finite set of colors, it is possible to determine its visual characteristics, i.e., apparent color, for a given set of field conditions using a parametric model. Accordingly, the viability of the camouflaged fabric with respect to specified field environments can be examined with respect to these visual characteristics, and not those associated with close visual inspection.

Figure 2:
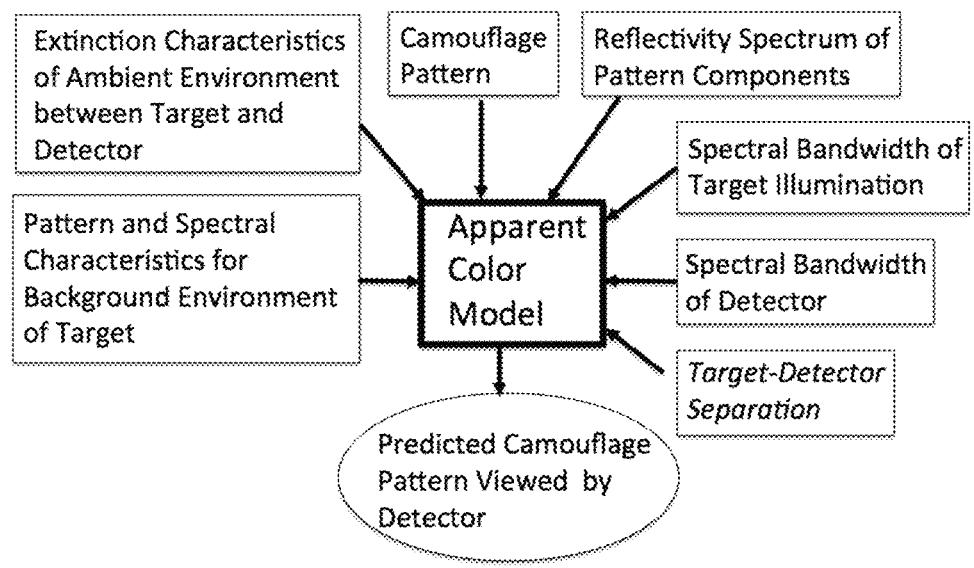
FIG. 2 shows a schematic representation of different types of input information for parametric modeling of apparent color.

The quantitative assessment of apparent color represents a metric for predicting target acquisition in the field. Shown in FIG. 2 is a schematic representation of different types of input information that would be required for a parametric model of apparent color. As implied by this figure, camouflaged fabric as viewed under practical field conditions, due to the many different types of external factors, should appear significantly different in contrast to close visual inspection.

The inherent complexity of external factors influencing apparent color suggests that its parametric modeling be in terms of far-field and statistical characteristics of camouflaged fabrics, which are consistent with practical field conditions.

Parametric models provide a means for encoding apparent color characteristics as a function of the different types of input information described in FIG. 2. These models are constructed according to the general characteristics of diffuse reflectance from a camouflage fabric having a specific pattern, which is represented by different formulations of the point spread function or PSF. A general parametric model for apparent color, which combines the different types of input information described in FIG. 2, is given by $$R_{obs}(m,n,\lambda)=P_{Ilm}(\lambda) \cdot R_{A,E}(m,n,\lambda) \cdot S_{eye}(\lambda) \quad (1)$$

where $P_{Ilm}$ is the spectral power distribution of the illuminating source, $S_{eye}$ is the spectral sensitivity of the human eye, and $$R_{A,E}(m, n, \lambda) = \left[\sum_{c=1}^{N_c}\sum_{i=1}^{N_i}\sum_{j=1}^{N_j} \sqrt{R_{bl,c}(i, j, \lambda)} \cdot PSF_c(i, j, m, n, \lambda)\right]^2 \exp[-\alpha_{ext}(L) \cdot L] \quad (2)$$

$$PSF(i, j, m, n, \lambda) = \frac{1}{|a|}\exp\left[-\frac{\pi(i-m)^2(\Delta l)^2}{a^2}\right]\exp\left[-\frac{\pi(j-n)^2(\Delta l)^2}{a^2}\right] \quad (3)$$

and $$\sum_{i=1}^{N_i}\sum_{j=1}^{N_j} PSF(i, j, n, m, \lambda) = 1 \quad (4)$$

Equations (1)-(4) represent a general framework for parametric modeling of apparent color, which is defined with respect to discrete pixels. $R_{A,E}(m,n,L)$ is the calculated apparent color reflectance as a function of pixel indices (m,n) and distance L between observer (or detector) and target, for a specified ambient environment whose influence is represented by the extinction coefficient $\alpha_{ext}(\lambda)$ The quantity $R_{A,E}(m,n,\lambda)$ is a function of pixel indices (m,n) and wavelength of illumination, and convolutions of the point spread function (or PSF) defined by Eq. (3) with amplitudes of the baseline reflectance $R_{bl}(m,n,\lambda)$ of the different colors. The baseline reflectance is that measured in laboratory for a given color at the fabric surface. The index "c" defined in Eq. (3) specifies the different colors making up the camouflage pattern. The quantity $\Delta l$ is the pixel width. The normalization condition defined by Eq. (4) imposes conservation of energy for values of the adjustable width parameter "a" of the PSF Eq. (3). This parameter specifies the level of spreading as a function of distance from the observer. It is important to note that the width parameter "a" is a function of distance between observer and target, as well as the diffuse reflectance properties of the base fabric, i.e., $$a=f(L,\text{diffuse reflectance properties}) \quad (5)$$

The functional dependence described by Eq. (5) may be determined by either laboratory or field measurements. In addition, given construction of the relationship based on prior measurements, adjustment of the width parameter "a" with respect to different target environments represents a criterion for model validation.

In principle, different types of numerical procedures can be used for modeling apparent color, which are based on the general framework defined by Eqs. (1)-(4). With respect to image analysis, or in general, target viewing as a function of distance, the underlying concept of apparent color is that of target-blurring level as a function of distance and environment. When dealing with multiple wavelengths of light (visible or invisible), this target-blurring includes the concept of decoloration and color (spectrum) variation as colors visually bleed into neighboring colors. For example, a segment of green camouflage becomes browner at far field when it is next to brown camouflage, and vice-versa. Accordingly, models and algorithms for simulating apparent color are in principle those of image processing associated with blurring. Typically, for image processing, the models and algorithms of blurring are for the purpose of image enhancement or improvement of image quality, i.e., deblurring. For simulation of apparent color, however, these models and algorithms are adopted for quantitative blurring of images, i.e., for the quantitative blurring of camouflage fabrics as a function of distance and environment, which is for prediction of apparent color. Many image smoothing algorithms may be used in accordance with the present invention such as, for example, uniform, triangular, Gaussian, or median filters. Examples of image smoothing algorithms (and other algorithms of use) may be found, for example, in the public domain software package "ImageJ" developed by the National Institutes of Health, and are generally known to those skilled in the art.

Presented now are examples of quantities and algorithms associated with the general framework for parametric modeling of apparent color defined by Eqs. (1)-(4), which is for simulation of the visual appearance of a known (or baseline) camouflage pattern as a function of distance from an observer. The quantities described would in practice be taken from a database of reflectance and absorption properties for different types of dyed fabrics and ambient environments, and power spectra for different sources of target illumination. The algorithms described are not the only possible ones, nor are they necessarily optimal in terms of procedure, but are given by way of example and demonstrate some general aspects of apparent color simulation.

Figure 3:
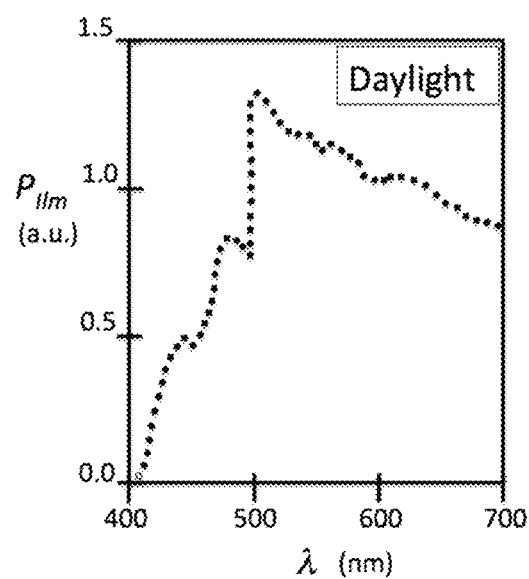
FIG. 3 shows estimated power spectrum $P_{Ilm}$ for illumination of a target by daylight, which is given in arbitrary units (a.u.)
Figure 4:
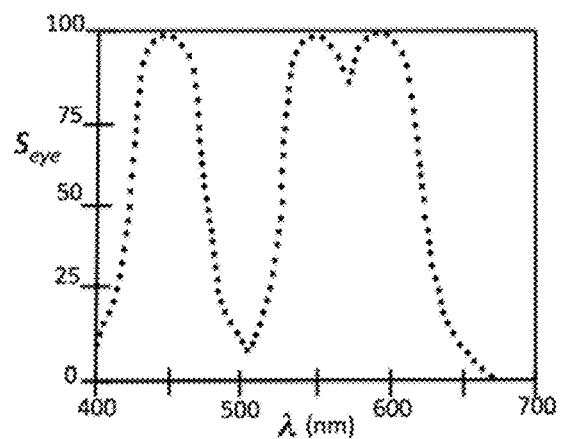
FIG. 4 shows spectral sensitivity of the human eye according to human brain perception of color.
Figure 5:
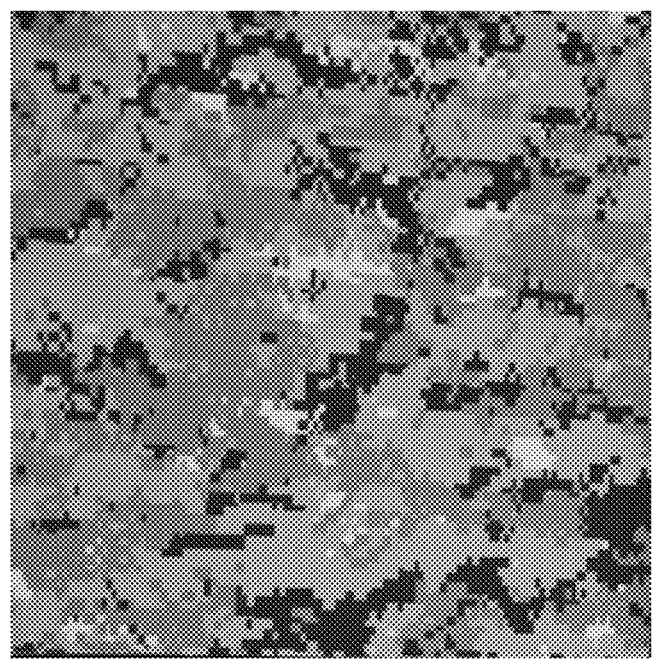
FIG. 5 shows an image of camouflage pattern AOR2 as would be viewed at small distances (near-field) from an observer.
Figure 6:
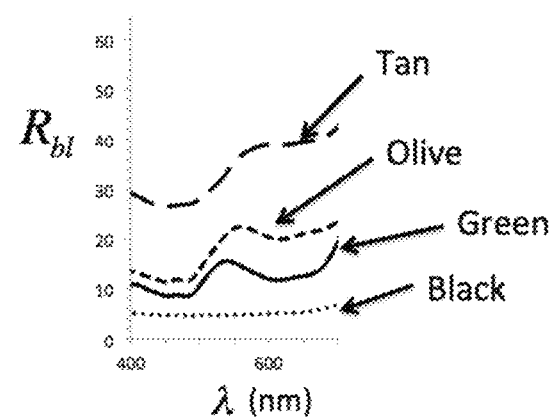
FIG. 6 shows baseline reflectance spectra of different colors comprising the camouflage pattern shown in FIG. 5.

Referring to Eq. (1), the observed reflectance $R_{obs}$ is the product of the power spectrum of the illuminating source $P_{Ilm}$, the apparent reflectance for a given ambient environment $R_{A,E}$, and the spectral sensitivity of the human eye $S_{eye}$. Examples of the quantities $P_{Ilm}$ and $S_{eye}$ are shown in FIGS. 3 and 4. Referring first to FIG. 3, showing an estimated power spectrum for illumination of a target by daylight, values of $P_{Ilm}$ are given in arbitrary units (a.u.). This representation emphasizes that detector response characteristics, not represented explicitly in Eq. (1), must also be considered for quantitative prediction of apparent color. That is to say, detector response characteristics determine the scaling of the power spectrum for target illumination. The spectral sensitivity of the human eye, e.g., FIG. 4, is based on the fact that the human brain perceives a limited range of the optical spectrum as color. Further, color perceived by the human brain, i.e., apparent color, can also be influenced by levels of contrast between targets and their environment. The apparent reflectance $R_{A,E}$ is the squared convolution of the amplitudes of baseline reflectances with the PSF for a given camouflage pattern (see Eq. (3)). Shown in FIGS. 5 and 6 are the camouflage pattern AOR2 and baseline reflectances of its component colors, respectively.

Equations (1)-(4) formally describe the process of camouflage-pattern blurring, whose observation is that of apparent color. Parametric models for simulation of apparent color can be based on either direct application of Eqs. (1)-(4)

(more representative of the underlying physics of blurring) or image processing algorithms that are mathematically equivalent to Eqs. (1)-(4), but perhaps more convenient for practical image analysis with respect to assessment of apparent-color quality. In what follows we consider two prototype simulations of apparent color that apply parametric models equivalent to Eqs. (1)-(4), yet are potentially convenient for quality assessment of apparent color. In contrast to image processing procedures that use the PSF for the deblurring of images, our goal is to use this function for simulating blurring of a known baseline camouflage pattern as a function of distance from observer and ambient environment. First, we note that in principle any image processing procedure applied for modeling blurring should be equivalent to procedures for image smoothing. Accordingly, image smoothing algorithms represent a convenient modeling approach for simulating apparent color. Second, apparent color of a camouflage pattern is a weighted superposition of different color contributions, where colors having relatively higher reflectance and area of fabric covering should "appear more" for increased separation of target and observer. Accordingly, procedures for image segmentation with respect to specified feature characteristics, i.e., different colors and their associated relative extent of covering, should provide a modeling approach for determining quantitatively relative contributions of component colors to the observed apparent color.

For simulations of apparent color using image smoothing as a function of distance, the distance between observer and target L, defined with respect to Eqs. (3) and (5), is not scaled according to any reference length. This follows in that, for simulations of apparent color in practice, functional dependence on the distance parameter L is calibrated with respect to field or laboratory measurements. Accordingly, for the simulations presented, image smoothing is modeled as a function of relative distances having unspecified length scales.

Figure 7:
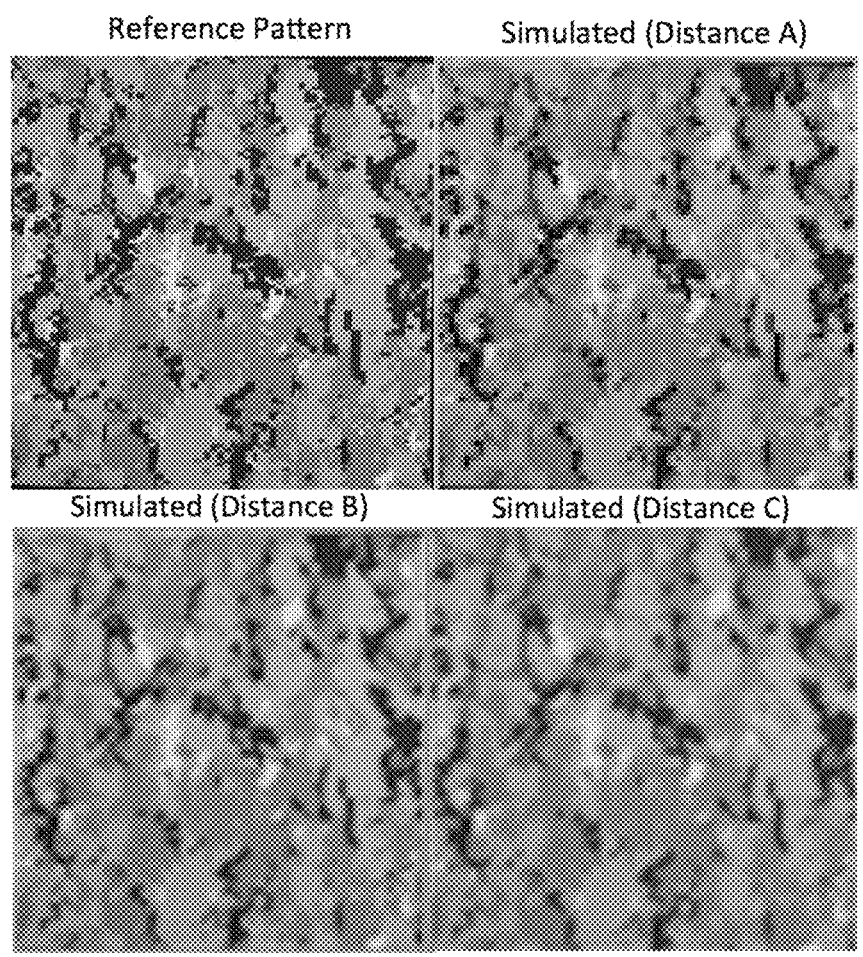
FIG. 7 shows a simulation of apparent color for camouflage pattern AOR2 as a function of arbitrary distance between observer and target. Distance from observer to target increases from distance A to distance B to distance C.

Shown in FIG. 7 is a simulation of apparent color for camouflage pattern AOR2 as a function of relative distance between observer and target, where the scale of length is not specified. The image smoothing procedure applied for this simulation entails assigning a uniform color to a given pixel, which is specified according to the largest area within that pixel covered by a given color. Referring to FIG. 7, it can be seen, qualitatively, that for increased distance between camouflage pattern AOR2 and observer, the apparent color tends toward a combination of green and olive green, while the contributions to overall color due to tan and black tend to diminish.

Figure 8:
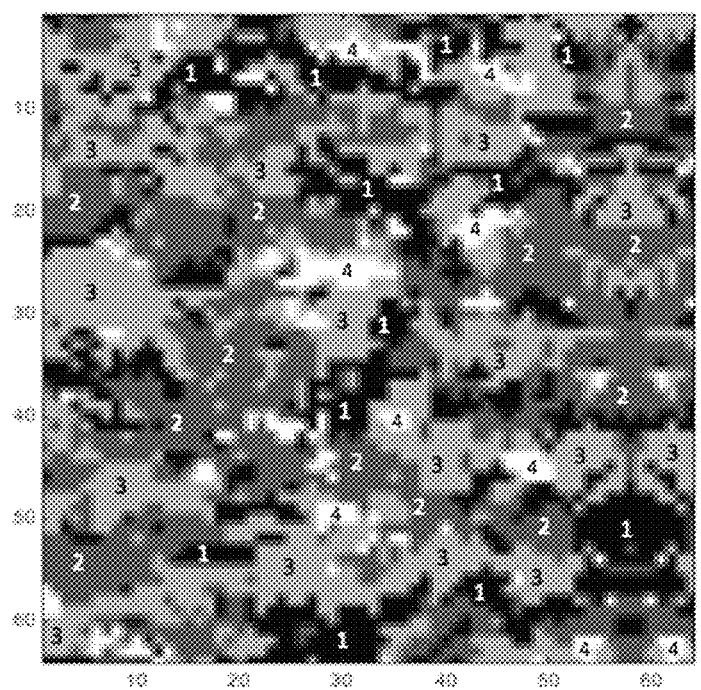
FIG. 8 shows a color index map of camouflage pattern AOR2 (1-black, 2-green, 3-olive green and 4-tan)
Figure 9:
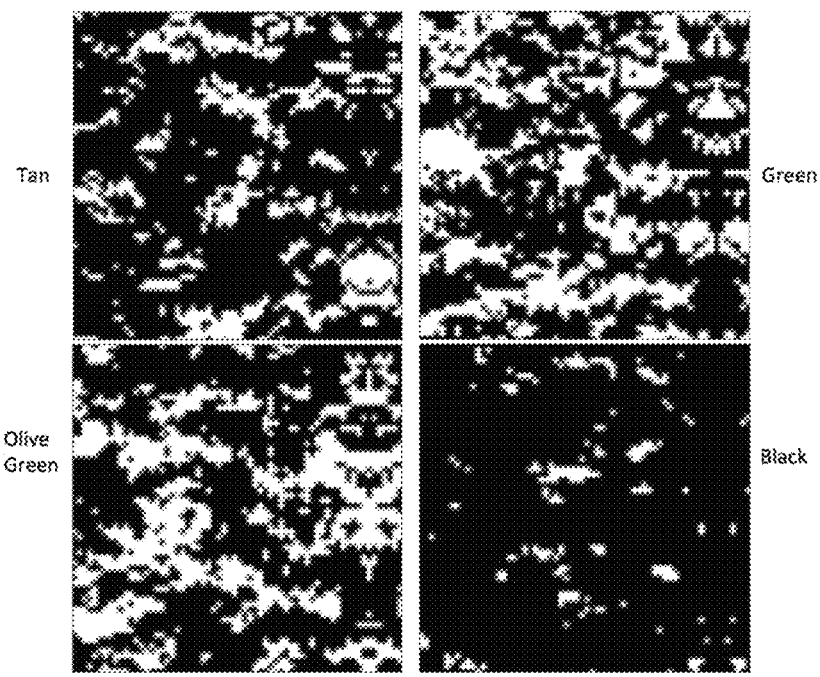
FIG. 9 shows color pattern segmentation with respect to different colors making up camouflage pattern AOR2 (see FIG. 5)
Figure 10:
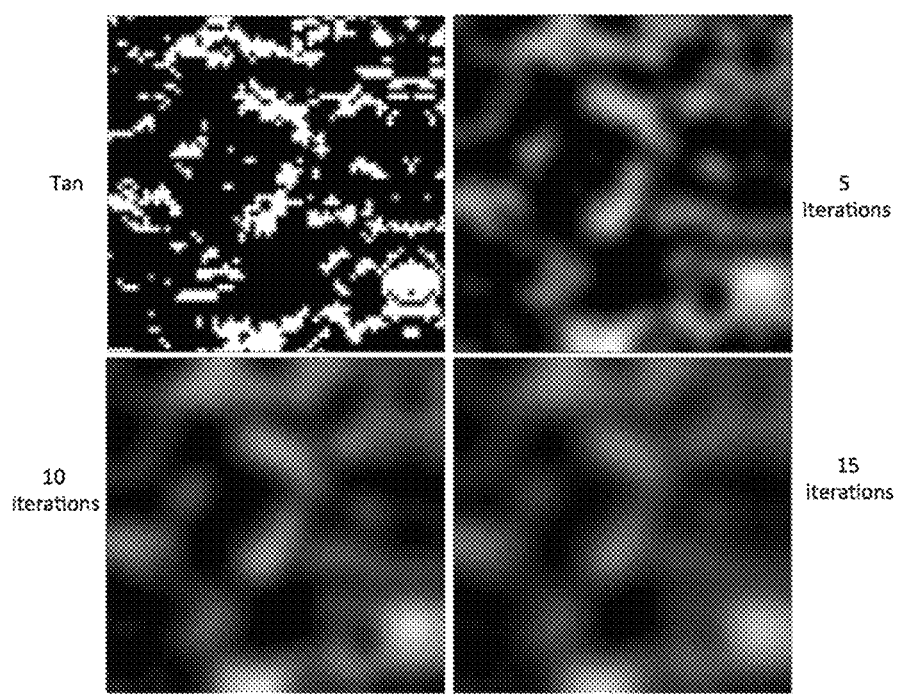
FIG. 10 shows the point-spread distribution (PSD) for "tan" within AOR2 as a function of arbitrary distance between observer and target. Iterations of image smoothing/filtering increase with distance.
Figure 11:
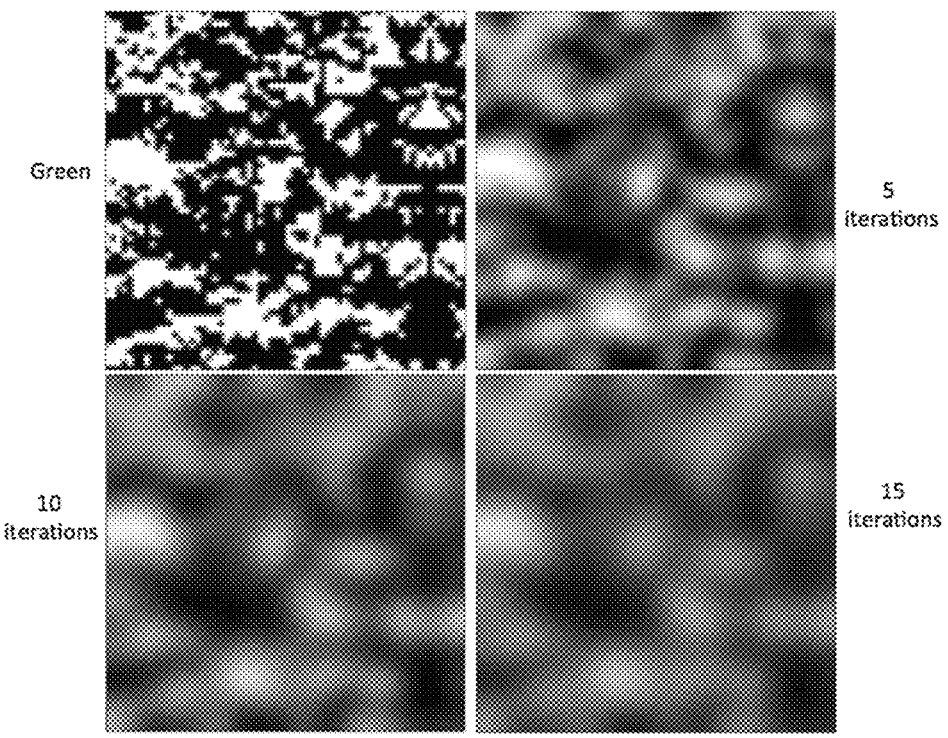
FIG. 11 shows the point-spread distribution (PSD) for "green" within AOR2 as a function of arbitrary distance between observer and target. Iterations of image smoothing/filtering increase with distance.
Figure 12:
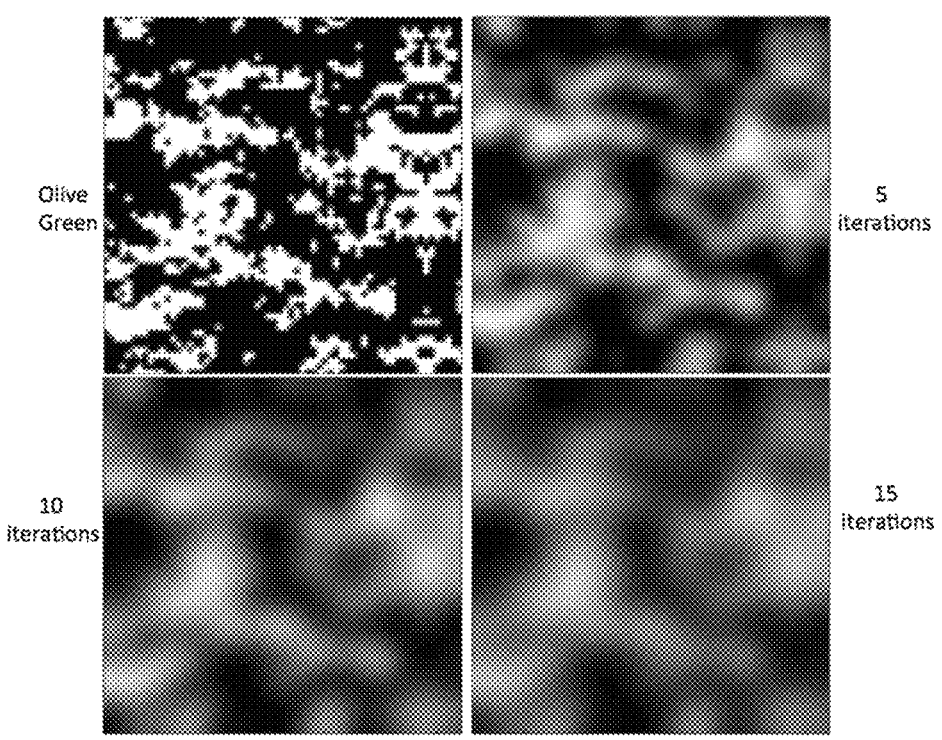
FIG. 12 shows the point-spread distribution (PSD) for "olive green" within AOR2 as a function of arbitrary distance between observer and target. Iterations of image smoothing/filtering increase with distance.
Figure 13:
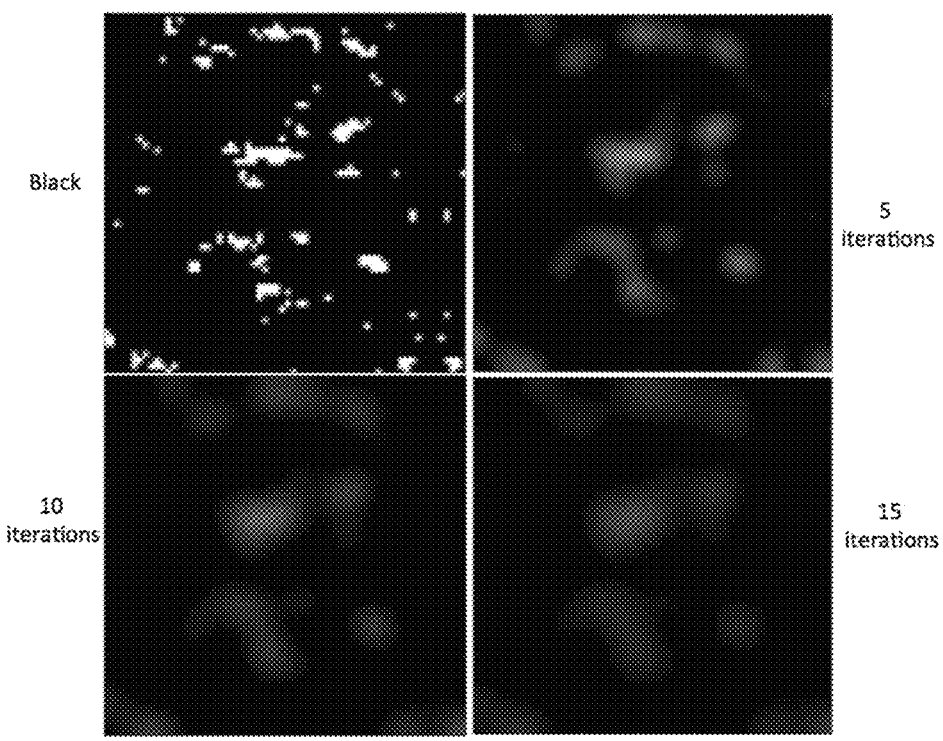
FIG. 13 shows the point-spread distribution (PSD) for "black" within AOR2 as a function of arbitrary distance between observer and target. Iterations of image smoothing/filtering increase with distance.
Figure 14A:
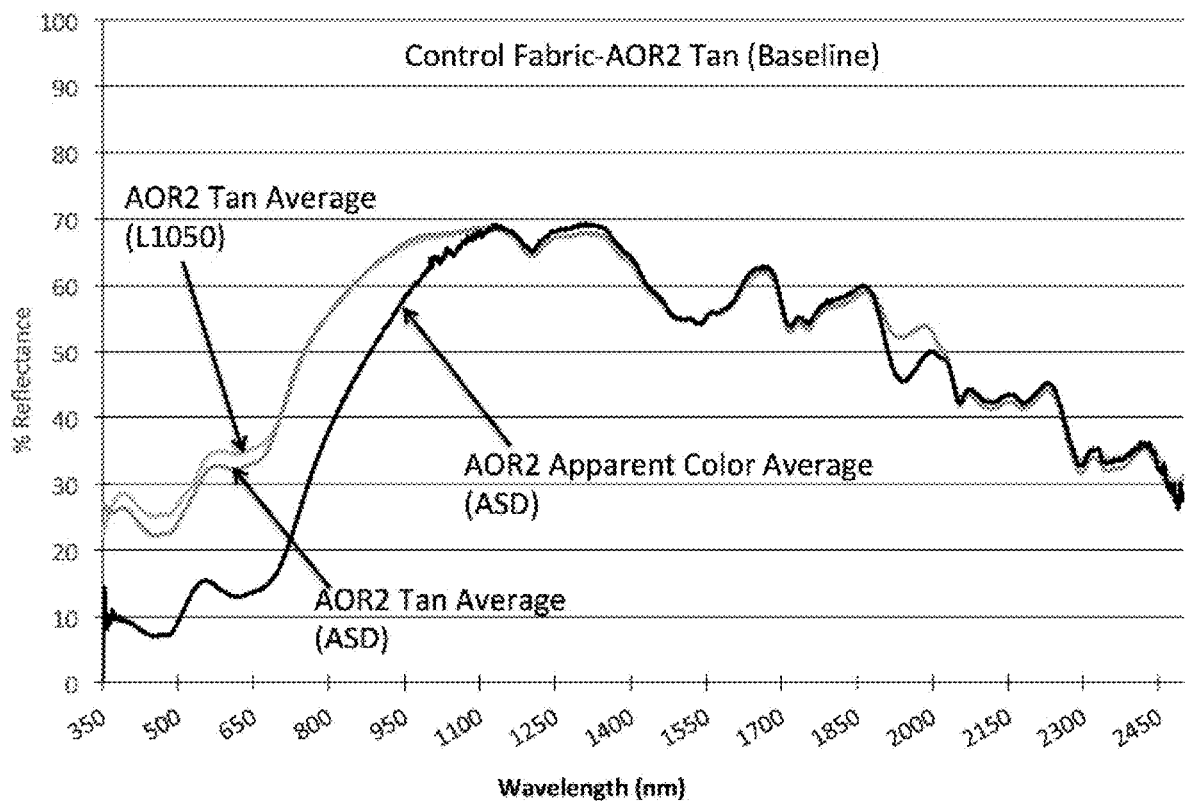
FIGS. 14A-D show spectra associated with different colors comprising Standard Woodland AOR2 (Control) camouflage pattern, which are measured at close distance using laboratory and hand-held spectrometers, and at 6 ft.
Figure 14B:
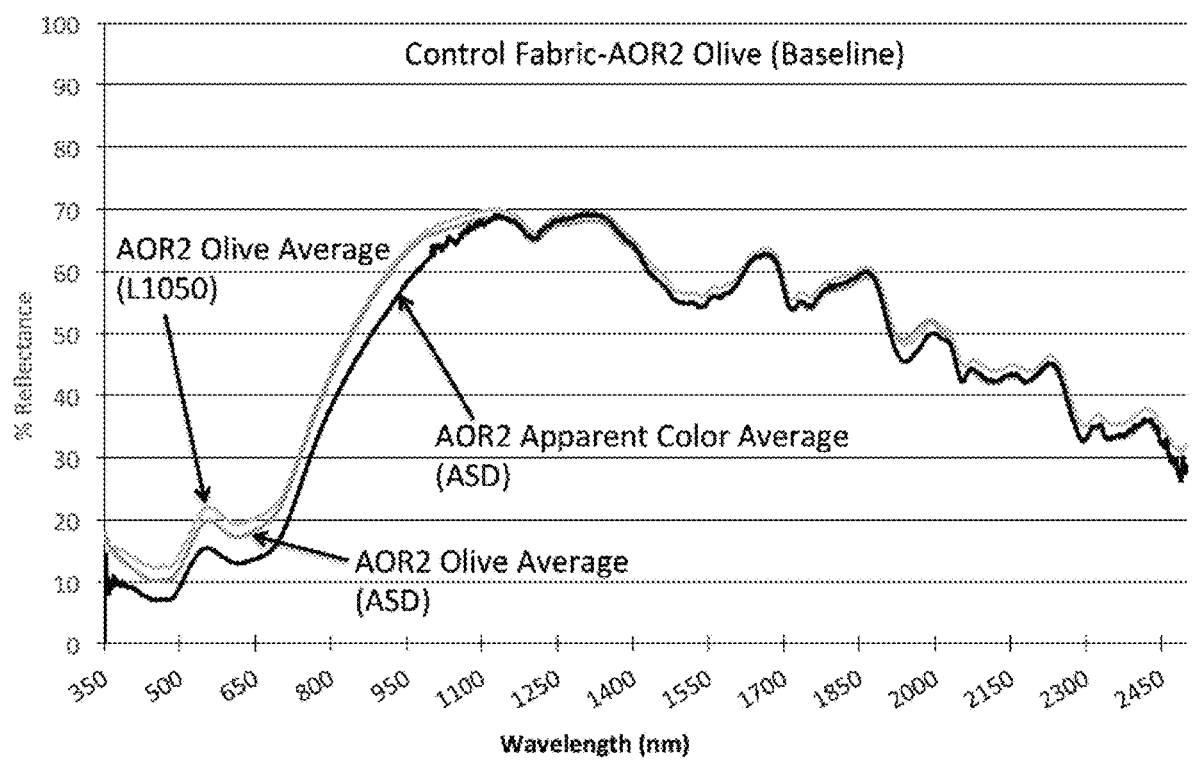
Figure 14C:
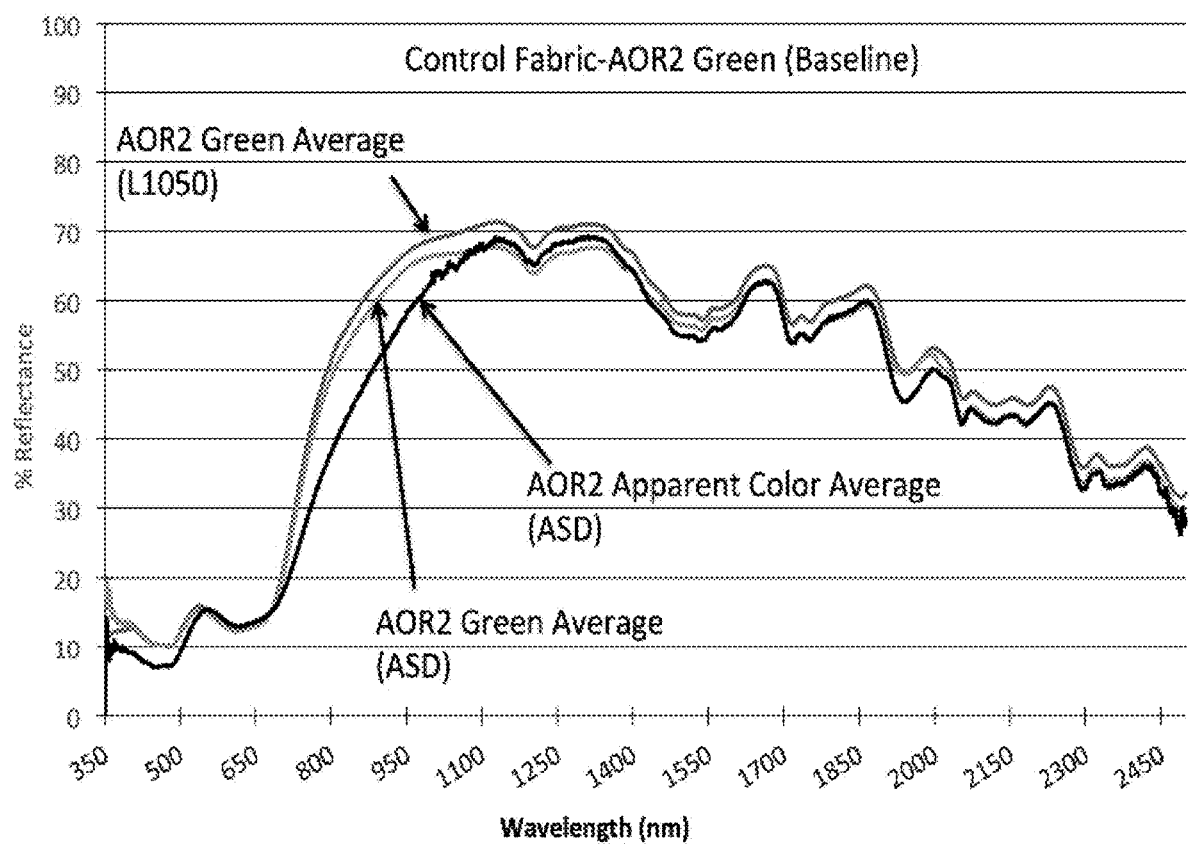
Figure 14D:
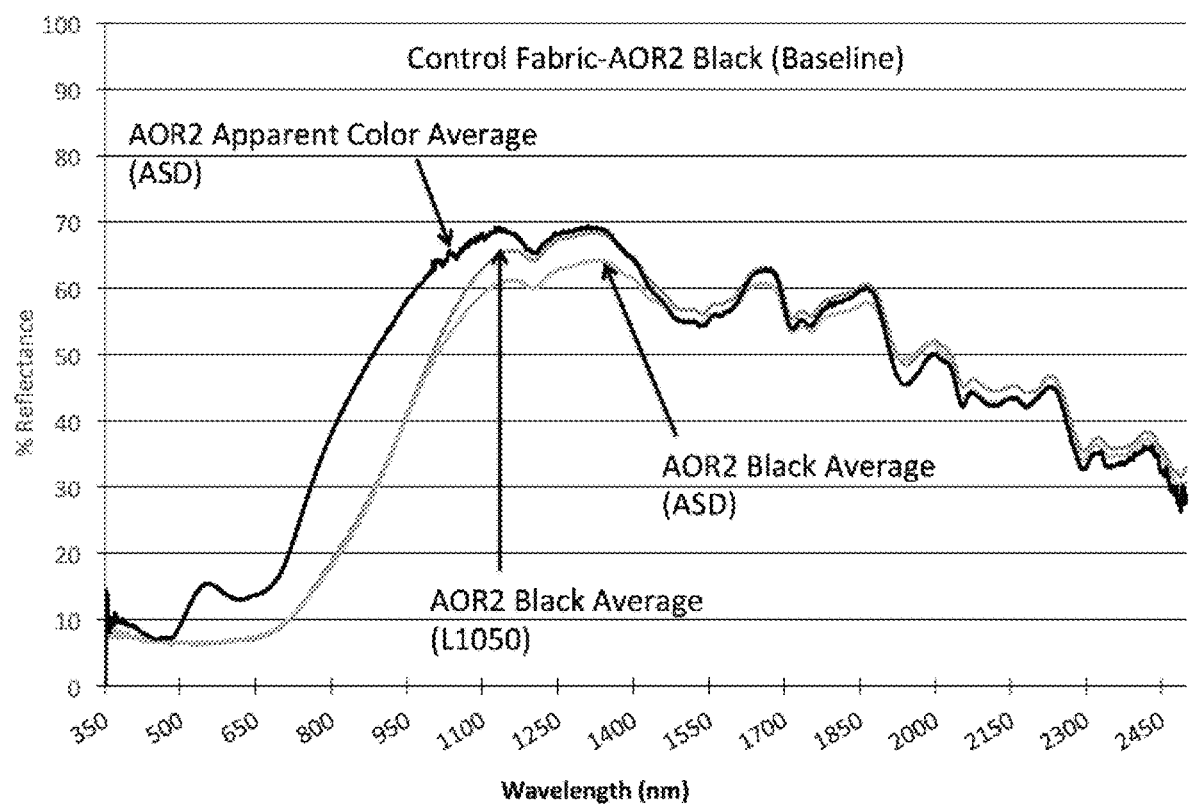
Figure 15A:
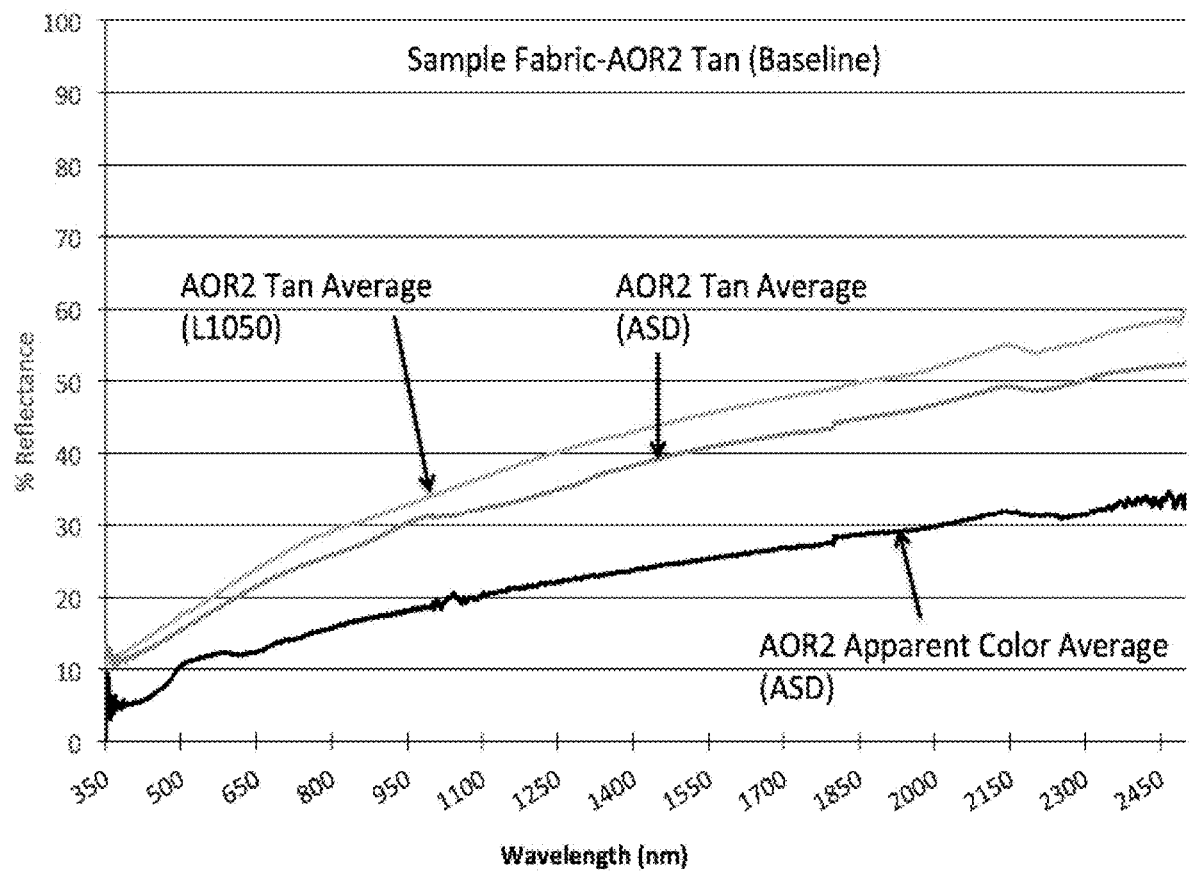
FIGS. 15A-D show spectra associated with different colors comprising Sample Woodland AOR2 (Sample) camouflage pattern, which are measured at close distance using laboratory and hand-held spectrometers, and at 6 ft.
Figure 15B:
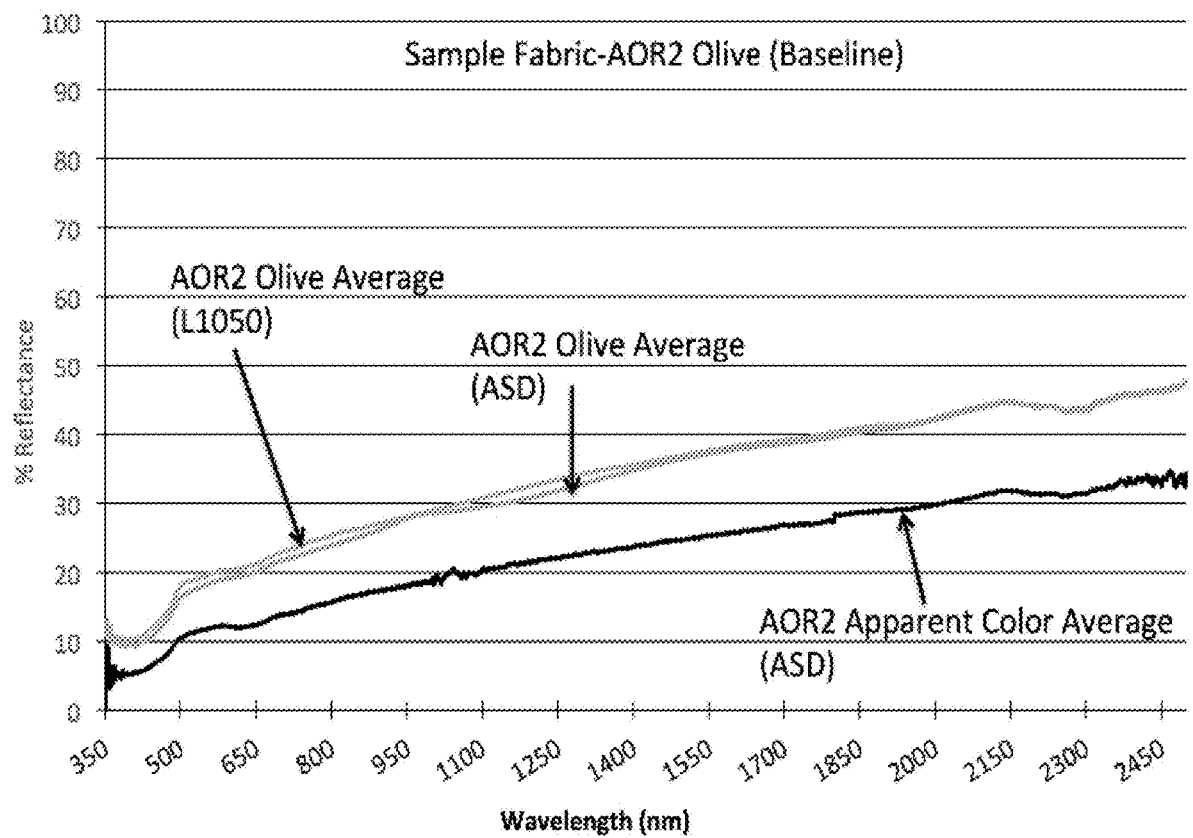
Figure 15C:
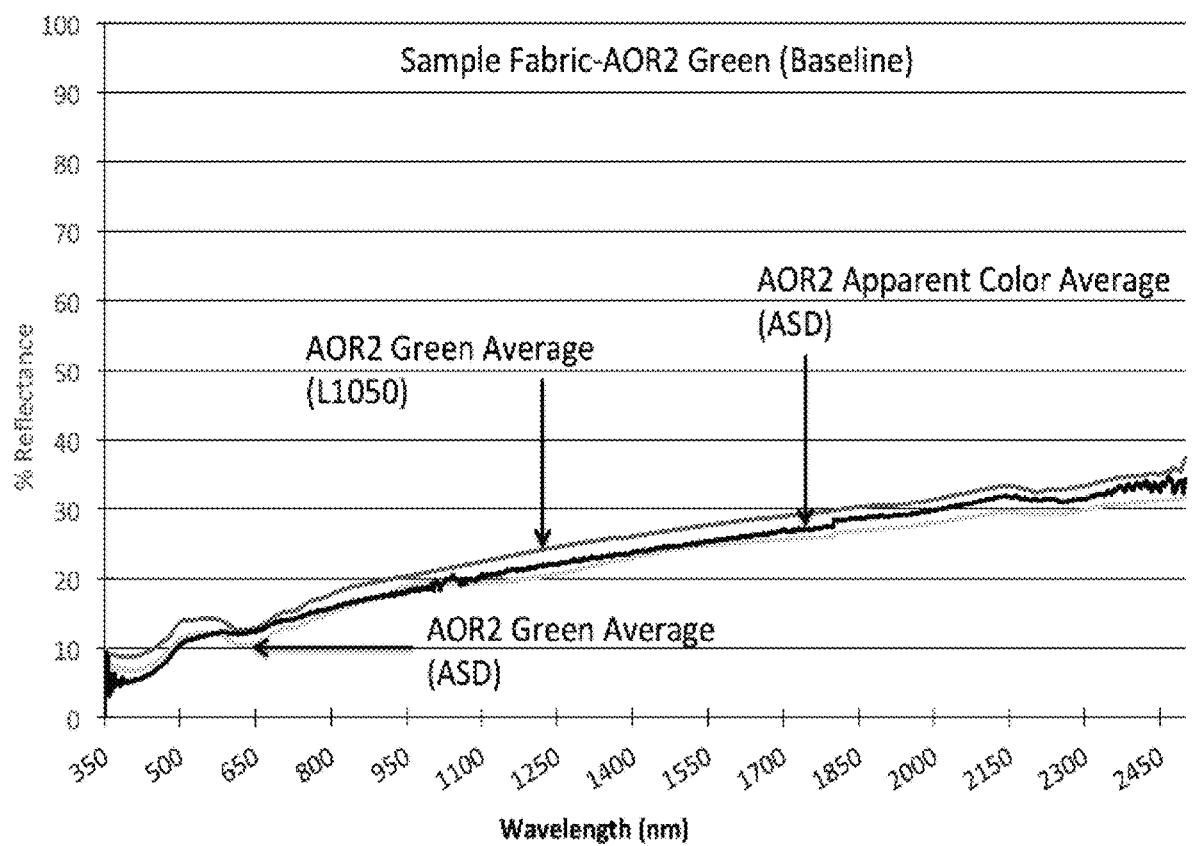
Figure 15D:
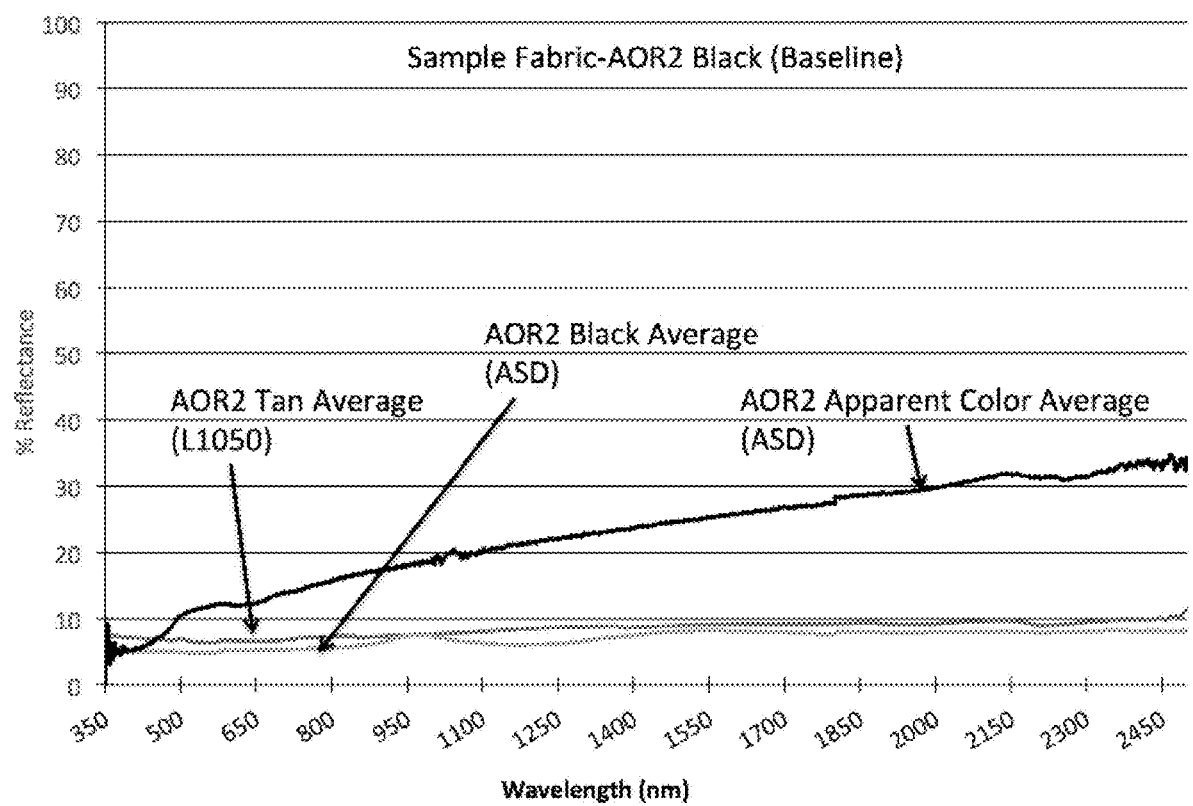

Camouflage-pattern segmentation may be used as a metric for apparent color. An analysis is shown herein that considers camouflage-pattern segmentation with respect to the different colors making up that pattern. The prototype pattern considered for segmentation is that of AOR2 shown in FIG. 5. Shown in FIGS. 8 and 9 are a gray-scale index map of the different colors making of this pattern, and pattern segmentation with respect to these colors, respectively. Referring to FIG. 9, the extent of covering by any given color is represented by white with respect to a black background. It follows that given pattern segmentation with respect to the different colors making up a pattern, the relative contribution of each pattern to the apparent color as a function of distance can be simulated using image smoothing procedures. For this type of simulation the concept of a point-spread function (PSF) is extended to that of a point-spread distribution (PSD) for each separate color making up a camouflage pattern. An example image smoothing procedure well adapted for simulating the PSD of a given color as a function of distance is the mean filtering of pixels, although other image smoothing/filtering algorithms may be used. Image smoothing by mean filtering entails pixel averaging according to a template of near neighbors for each pixel. The pixel averaging procedure is applied iteratively such that image blurring is calibrated with respect to number of iterations, i.e., iterations of mean filtering increase with distance.

Shown in FIGS. 10-13 are point-spread distributions (PSD) for tan, green, olive green and black, respectively, within camouflage pattern AOR2, as a function of arbitrary distance between observer and target, where iterations of image smoothing/filtering increase with distance. Referring to these figures, it is seen that color pattern segmentation with respect to different colors and mean filtering of the segmented colors as a function of distance, which in practice would be calibrated according to field measurements, provides a quantitative metric for apparent camouflage. For example, comparison of the PSDs shown in FIG. 8, for tan and black, respectively, to those shown for green and olive green, respectively, shows quantitatively that for increased distance between camouflage pattern AOR2 and observer, the apparent color tends toward a combination of green and olive green, while the contributions to overall color due to tan and black tend to diminish.

These results demonstrate that the concept of apparent color can provide for better assessment of camouflaged-fabric characteristics for a given set of field conditions using parametric models based on image processing procedures. These procedures include bin averaging of pixels as a function of distance, image segmentation and mean filtering, which are calibrated with respect to laboratory or field measurements. In addition, this concept can provide for the design and fabrication of camouflaged patterns that are optimal with respect to realistic field conditions associated with different types of AOR environments.

Fabrication and design of camouflaged-fabrics according to the concept of apparent color or apparent NIR/SWIR spectra at far field may consider: (1) material characterization and reflectance properties of the substrate host fabric and the dyes, binders, etc., comprising camouflage fabrics; (2) far-field characteristics of camouflage patterns and individual spectral features of component pattern elements comprising patterns; (3) imaging devices for quantitative viewing of camouflaged fabrics a far field; (4) spectrophotometers; and (5) imaging processing software.

Shown in FIGS. 14A-D and 15A-D are spectra of individual AOR2 colors, for fabric types Standard Woodland AOR2 (Control) and Sample Woodland AOR2 (Sample), respectively, measured at close distance between target and a detector by two different spectrometers for wavelengths in the range 350-2500 nm. Also shown in these figures, for the different fabric types (Control and Sample), are spectra correlated with the apparent color of all four AOR2 colors blended at a distance of 6 ft from the detector source.

Referring to FIGS. 14A-D and 15A-D, the spectra designated "apparent color average" can be correlated with spectra that would be observed at far field, i.e., the apparent color spectra that are the combination of all visible wavelengths (380-700 nm) of light reflected from large $m^2$) fabric-sample sizes for a given standoff distance (e.g., 25-100 ft). Although the relative intensities of these apparent-color spectra are expected to decrease with increased target distance, the shape of the spectra would remain essentially the same, neglecting influences of ambient environments.

The spectra of individual AOR2 colors shown on FIGS. 14A-D and 15A-D can provide, in principle, information for modeling apparent color, which considers the dependence of apparent color on such factors as diffuse reflectance, decreased quality of camouflage pattern, and influence of background environment on observed spectral features. For example, using pattern segmentation information and the measured spectra of individual AOR2 colors shown in FIGS. 14A-D and 15A-D, one may estimate the apparent-color spectrum using $$R_{total} = \left[ \frac{w_{black}\sqrt{R_{black}} + w_{tan}\sqrt{R_{tan}} + w_{olive}\sqrt{R_{olive}} + w_{green}\sqrt{R_{green}}}{w_{black} + w_{tan} + w_{olive} + w_{green}} \right]^2 \quad (6)$$

where $R_{color}$ and $w_{color}$ are the measured reflectance and relative segmentation covering for that color. It follows that Eq. (6) can also be applied for modeling the influence of decreases in camouflage-pattern quality. For example, simulated blurred segmentation patterns such as those shown in FIGS. 14A-D could be calibrated according to observed camouflage-pattern degradation, and thus used for calculation of relative segmentation covering $w_{color}$ associated with reduced camouflage-pattern quality.

A consequence of near-field criteria for assessment of camouflage-fabric viability is accumulated stockpiles of fabrics. Design of camouflage fabrics according to far field with respect to a viewer or detection system for a specified AOR establishes an opportunity to use available fabric stockpiles.

Another consequence of near-field criteria for camouflage-fabric assessment is that of reduced life cycle. Far-field camouflage-fabric assessment using metrics based on image processing procedures can provide standards for increased life cycle of in-service garments.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of evaluating camouflage for a specified area of responsibility, the method comprising:
    calculating an apparent spectrum of the camouflage at far field with respect to an observer;
    calculating an apparent spectrum of the specified area of responsibility at far field with respect to the observer;
    calculating a difference between the apparent spectrum of the camouflage with the apparent spectrum of the area of responsibility; and
    comparing the difference to a predetermined threshold, thereby determining suitability of the camouflage for the specified area of responsibility,
    wherein calculating an apparent spectrum of the camouflage includes the step of blurring an image of the camouflage by use of a point spread function.

2. The method of claim 1, wherein the step of blurring the image of the camouflage includes image smoothing by a filtering or smoothing algorithm.

3. The method of claim 2, wherein the step of blurring the image of the camouflage includes image smoothing by mean filtering.

4. The method of claim 1, wherein calculating an apparent spectrum of the specified area of responsibility includes the step of blurring an image of the camouflage by use of a point spread function.

5. A method of evaluating camouflage for a specified area of responsibility, the method comprising:
    calculating an apparent spectrum of the camouflage at far field with respect to an observer;
    calculating an apparent spectrum of the specified area of responsibility at far field with respect to the observer;
    calculating a difference between the apparent spectrum of the camouflage with the apparent spectrum of the area of responsibility; and
    comparing the difference to a predetermined threshold, thereby determining suitability of the camouflage for the specified area of responsibility
    wherein calculating an apparent spectrum of the specified area of responsibility includes the step of blurring an image of the camouflage by use of a point spread distribution.

6. The method of claim 5, wherein the step of blurring the image of the specified area of responsibility includes image smoothing by a filtering or smoothing algorithm.

7. The method of claim 6, wherein the step of blurring the image of the specified area of responsibility includes image smoothing by mean filtering.

* * * * *